United States Patent
Karaoguz et al.

(10) Patent No.: US 9,098,128 B2
(45) Date of Patent: Aug. 4, 2015

(54) SYSTEM AND METHOD IN A TELEVISION RECEIVER FOR PROVIDING USER-SELECTION OF OBJECTS IN A TELEVISION PROGRAM

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 202 days.

(21) Appl. No.: 12/850,866

(22) Filed: Aug. 5, 2010

(65) Prior Publication Data

US 2011/0063509 A1    Mar. 17, 2011

Related U.S. Application Data

(60) Provisional application No. 61/242,234, filed on Sep. 14, 2009.

(51) Int. Cl.
*H04N 7/173* (2011.01)
*G06F 3/00* (2006.01)
(Continued)

(52) U.S. Cl.
CPC ............ *G06F 3/0346* (2013.01); *G06F 3/0304* (2013.01); *G06F 3/0325* (2013.01); *G06F 3/0386* (2013.01); *G06F 3/0428* (2013.01); *H04N 5/445* (2013.01); *H04N 21/23892* (2013.01); *H04N 21/234318* (2013.01); *H04N 21/2408* (2013.01); *H04N 21/25841* (2013.01); *H04N 21/2668* (2013.01); *H04N 21/42204* (2013.01); *H04N 21/436* (2013.01); *H04N 21/438* (2013.01); *H04N 21/4325* (2013.01); *H04N 21/4334* (2013.01); *H04N 21/4524* (2013.01); *H04N 21/472* (2013.01); *H04N 21/4725* (2013.01); *H04N 21/4728* (2013.01); *H04N 21/4826* (2013.01); *H04N 21/812* (2013.01); *H04N 21/845* (2013.01); *H04N 21/858* (2013.01); *H04N 21/8545* (2013.01);
(Continued)

(58) Field of Classification Search
USPC ................. 725/38, 113, 112, 110, 63, 64, 60; 715/204; 348/80, 734; 340/12.54; 705/26, 26.5
See application file for complete search history.

(56) References Cited

U.S. PATENT DOCUMENTS 5,111,511 A * 5/1992 Ishii et al. ...................... 382/107
5,408,258 A * 4/1995 Kolessar ......................... 725/14
(Continued)

FOREIGN PATENT DOCUMENTS

CN    1193869 A    9/1998
CN    1300501 A    6/2001
(Continued)

OTHER PUBLICATIONS

Office Action from related U.S. Appl. No. 12/774,154 dated Dec. 5, 2012.
(Continued)

*Primary Examiner* — Pankaj Kumar
*Assistant Examiner* — Reuben M Brown
(74) *Attorney, Agent, or Firm* — Brinks Gilson & Lione

(57) ABSTRACT

A system and method in a television receiver (e.g., a television receiver external to a television) for providing user-selection of objects in a television program, substantially as shown in and/or described in connection with at least one of the figures, as set forth more completely in the claims.

35 Claims, 5 Drawing Sheets

(51) Int. Cl.

| | | |
|---|---|---|
| *G06F 3/0346* | (2013.01) | |
| *G06F 3/03* | (2006.01) | |
| *G06F 3/042* | (2006.01) | |
| *H04N 21/2343* | (2011.01) | |
| *H04N 21/2389* | (2011.01) | |
| *H04N 21/422* | (2011.01) | |
| *H04N 21/432* | (2011.01) | |
| *H04N 21/433* | (2011.01) | |
| *H04N 21/4725* | (2011.01) | |
| *H04N 21/4728* | (2011.01) | |
| *H04N 21/845* | (2011.01) | |
| *G06F 3/038* | (2013.01) | |
| *H04N 5/445* | (2011.01) | |
| *H04N 21/482* | (2011.01) | |
| *H04N 21/436* | (2011.01) | |
| *H04N 21/258* | (2011.01) | |
| *H04N 21/45* | (2011.01) | |
| *H04N 21/2668* | (2011.01) | |
| *H04N 21/472* | (2011.01) | |
| *H04N 21/8545* | (2011.01) | |
| *H04N 21/858* | (2011.01) | |
| *H04N 21/24* | (2011.01) | |
| *H04N 21/438* | (2011.01) | |
| *H04N 21/81* | (2011.01) | |
| *H04N 7/16* | (2011.01) | |
| *H04N 21/458* | (2011.01) | |
| *H04N 5/76* | (2006.01) | |
| *H04N 9/82* | (2006.01) | |
| *H04N 5/44* | (2011.01) | |

(52) U.S. Cl.
CPC ............. *H04N 5/76* (2013.01); *H04N 9/8205* (2013.01); *H04N 2005/4428* (2013.01); *H04N 2005/4432* (2013.01)

(56) References Cited

U.S. PATENT DOCUMENTS

| | | | | |
|---|---|---|---|---|
| 5,543,851 | A | | 8/1996 | Chang |
| 5,602,568 | A | | 2/1997 | Kim |
| 5,708,845 | A | * | 1/1998 | Wistendahl et al. ........... 715/202 |
| 5,718,845 | A | * | 2/1998 | Drost et al. ..................... 252/582 |
| 5,721,584 | A | | 2/1998 | Yoshinobu et al. |
| 5,727,141 | A | * | 3/1998 | Hoddie et al. ................. 345/475 |
| 5,793,361 | A | | 8/1998 | Kahn et al. |
| 5,929,849 | A | * | 7/1999 | Kikinis .......................... 725/113 |
| 6,097,441 | A | | 8/2000 | Allport |
| 6,122,660 | A | * | 9/2000 | Baransky et al. .............. 709/217 |
| 6,133,911 | A | | 10/2000 | Kim |
| 6,255,961 | B1 | | 7/2001 | Van Ryzin et al. |
| 6,256,785 | B1 | | 7/2001 | Klappert et al. |
| 6,314,569 | B1 | * | 11/2001 | Chernock et al. ................ 725/37 |
| 6,317,714 | B1 | | 11/2001 | Del Castillo et al. |
| 6,349,410 | B1 | | 2/2002 | Lortz |
| 6,407,779 | B1 | | 6/2002 | Herz |
| 6,532,592 | B1 | | 3/2003 | Shintani et al. |
| 6,538,672 | B1 | | 3/2003 | Dobbelaar |
| 6,567,984 | B1 | | 5/2003 | Allport |
| 6,931,660 | B1 | | 8/2005 | Kalluri et al. |
| 7,053,965 | B1 | | 5/2006 | Fan |
| 7,057,670 | B2 | * | 6/2006 | Kikinis .......................... 348/601 |
| 7,102,616 | B1 | | 9/2006 | Sleator |
| 7,158,676 | B1 | | 1/2007 | Rainsford |
| 7,301,530 | B2 | | 11/2007 | Lee et al. |
| 7,344,084 | B2 | | 3/2008 | DeCosta |
| 7,360,232 | B2 | | 4/2008 | Mitchell |
| 7,409,437 | B2 | | 8/2008 | Ullman et al. |
| 7,535,456 | B2 | | 5/2009 | Liberty |
| 7,536,706 | B1 | | 5/2009 | Sezan |
| 7,612,748 | B2 | * | 11/2009 | Tateuchi ........................... 345/81 |
| 7,631,338 | B2 | | 12/2009 | Del Sesto et al. |
| 7,805,747 | B2 | * | 9/2010 | Klappert et al. ............... 725/112 |
| 7,827,577 | B2 | | 11/2010 | Pack |
| 7,864,159 | B2 | | 1/2011 | Sweetser et al. |
| 7,889,175 | B2 | | 2/2011 | Kryze et al. |
| 7,890,380 | B2 | | 2/2011 | Stefanik |
| 7,987,478 | B2 | | 7/2011 | Minor |
| 8,068,781 | B2 | * | 11/2011 | Ilan et al. ...................... 455/3.01 |
| 8,095,423 | B2 | | 1/2012 | Nichols |
| 8,181,212 | B2 | | 5/2012 | Sigal |
| 8,223,136 | B2 | | 7/2012 | Hu et al. |
| 8,269,746 | B2 | | 9/2012 | Hodges et al. |
| 8,290,513 | B2 | | 10/2012 | Forstall et al. |
| 8,359,628 | B2 | | 1/2013 | Kitaru et al. |
| 8,421,746 | B2 | | 4/2013 | Igoe |
| 8,436,809 | B2 | | 5/2013 | Sohn et al. |
| 8,451,223 | B2 | * | 5/2013 | Choi et al. ...................... 345/158 |
| 8,608,535 | B2 | | 12/2013 | Weston |
| 8,760,401 | B2 | | 6/2014 | Kimmel et al. |
| 2001/0019368 | A1 | | 9/2001 | Holme et al. |
| 2001/0023436 | A1 | | 9/2001 | Srinivasan |
| 2001/0047298 | A1 | | 11/2001 | Moore |
| 2002/0016965 | A1 | | 2/2002 | Tomsen |
| 2002/0040482 | A1 | | 4/2002 | Sextro |
| 2002/0042925 | A1 | | 4/2002 | Ebisu |
| 2002/0056109 | A1 | * | 5/2002 | Tomsen ........................... 725/60 |
| 2002/0056136 | A1 | | 5/2002 | Wistendahl |
| 2002/0069405 | A1 | | 6/2002 | Chapin et al. |
| 2002/0078446 | A1 | | 6/2002 | Dakss |
| 2002/0090114 | A1 | | 7/2002 | Rhoads |
| 2002/0120934 | A1 | | 8/2002 | Abrahams |
| 2002/0136432 | A1 | | 9/2002 | Koike et al. |
| 2002/0162120 | A1 | | 10/2002 | Mitchell |
| 2003/0005445 | A1 | | 1/2003 | Schein |
| 2003/0023981 | A1 | * | 1/2003 | Lemmons ...................... 725/109 |
| 2003/0028873 | A1 | | 2/2003 | Lemmons |
| 2003/0035075 | A1 | | 2/2003 | Butler et al. |
| 2003/0051253 | A1 | | 3/2003 | Barone, Jr. |
| 2003/0054878 | A1 | | 3/2003 | Benoy et al. |
| 2003/0079224 | A1 | | 4/2003 | Komar et al. |
| 2003/0115602 | A1 | | 6/2003 | Knee |
| 2003/0145326 | A1 | | 7/2003 | Gutta et al. |
| 2003/0212996 | A1 | | 11/2003 | Wolzien |
| 2003/0217360 | A1 | | 11/2003 | Gordon et al. |
| 2003/0236752 | A1 | | 12/2003 | Dawson et al. |
| 2004/0078814 | A1 | | 4/2004 | Allen |
| 2004/0109087 | A1 | | 6/2004 | Robinson et al. |
| 2004/0119701 | A1 | | 6/2004 | Mulligan et al. |
| 2004/0167855 | A1 | | 8/2004 | Cambridge |
| 2004/0221025 | A1 | | 11/2004 | Johnson et al. |
| 2004/0236865 | A1 | | 11/2004 | Ullman |
| 2004/0268401 | A1 | | 12/2004 | Gray et al. |
| 2005/0028208 | A1 | | 2/2005 | Ellis |
| 2005/0086690 | A1 | * | 4/2005 | Gilfix et al. ..................... 725/42 |
| 2005/0132420 | A1 | | 6/2005 | Howard et al. |
| 2005/0137958 | A1 | | 6/2005 | Huber et al. |
| 2005/0153687 | A1 | | 7/2005 | Niemenmaa et al. |
| 2005/0177861 | A1 | | 8/2005 | Ma et al. |
| 2005/0193425 | A1 | | 9/2005 | Sull et al. |
| 2005/0229227 | A1 | | 10/2005 | Rogers |
| 2005/0234782 | A1 | | 10/2005 | Schackne et al. |
| 2005/0251835 | A1 | | 11/2005 | Scott |
| 2005/0262542 | A1 | | 11/2005 | DeWeese et al. |
| 2006/0037044 | A1 | | 2/2006 | Daniels |
| 2006/0064734 | A1 | | 3/2006 | Ma |
| 2006/0099964 | A1 | | 5/2006 | Barrese et al. |
| 2006/0152489 | A1 | | 7/2006 | Sweetser et al. |
| 2006/0174273 | A1 | | 8/2006 | Park |
| 2006/0195878 | A1 | | 8/2006 | Pack et al. |
| 2006/0241864 | A1 | | 10/2006 | Rosenberg |
| 2006/0259930 | A1 | | 11/2006 | Rothschild |
| 2006/0268895 | A1 | * | 11/2006 | Kotzin ........................ 370/395.64 |
| 2006/0282847 | A1 | | 12/2006 | Gupte |
| 2007/0097275 | A1 | * | 5/2007 | Dresti et al. ................... 348/734 |
| 2007/0130581 | A1 | | 6/2007 | Del Sesto et al. |
| 2007/0156521 | A1 | | 7/2007 | Yates |
| 2007/0157260 | A1 | | 7/2007 | Walker |
| 2007/0195205 | A1 | | 8/2007 | Lowe |
| 2007/0199014 | A1 | | 8/2007 | Clark et al. |

(56) References Cited

U.S. PATENT DOCUMENTS

| | | |
|---|---|---|
| 2007/0250901 A1 | 10/2007 | McIntire et al. |
| 2007/0261079 A1 | 11/2007 | Pack et al. |
| 2007/0266406 A1 | 11/2007 | Aravamudan |
| 2007/0277201 A1 | 11/2007 | Wong |
| 2007/0300263 A1 | 12/2007 | Barton |
| 2008/0052750 A1* | 2/2008 | Grunnet-Jepsen et al. ... 725/109 |
| 2008/0066097 A1 | 3/2008 | Park et al. |
| 2008/0066129 A1 | 3/2008 | Katcher et al. |
| 2008/0089551 A1 | 4/2008 | Heather et al. |
| 2008/0109851 A1 | 5/2008 | Heather |
| 2008/0132163 A1 | 6/2008 | Ilan et al. |
| 2008/0134342 A1 | 6/2008 | Shamoon et al. |
| 2008/0136754 A1 | 6/2008 | Tsuzaki et al. |
| 2008/0172693 A1 | 7/2008 | Ludvig |
| 2008/0184132 A1 | 7/2008 | Zato |
| 2008/0204603 A1 | 8/2008 | Hattori |
| 2008/0204605 A1 | 8/2008 | Tsai |
| 2008/0209480 A1 | 8/2008 | Eide |
| 2009/0021473 A1 | 1/2009 | Grant et al. |
| 2009/0037947 A1 | 2/2009 | Patil |
| 2009/0077394 A1 | 3/2009 | Tsai et al. |
| 2009/0083815 A1 | 3/2009 | McMaster et al. |
| 2009/0113475 A1 | 4/2009 | Li |
| 2009/0165041 A1 | 6/2009 | Penberthy et al. |
| 2009/0165048 A1 | 6/2009 | Nishimura |
| 2009/0187862 A1 | 7/2009 | DaCosta |
| 2009/0199259 A1 | 8/2009 | Alao et al. |
| 2009/0217317 A1 | 8/2009 | White |
| 2009/0235312 A1 | 9/2009 | Morad |
| 2009/0237572 A1 | 9/2009 | Kishimoto |
| 2009/0256811 A1 | 10/2009 | Pasquariello |
| 2009/0271815 A1 | 10/2009 | Contin et al. |
| 2009/0296686 A1 | 12/2009 | Pirani et al. |
| 2009/0327894 A1 | 12/2009 | Rakib et al. |
| 2010/0005488 A1 | 1/2010 | Rakib et al. |
| 2010/0064320 A1* | 3/2010 | Angiolillo et al. ............. 725/46 |
| 2010/0097348 A1 | 4/2010 | Park |
| 2010/0098074 A1 | 4/2010 | Kokernak |
| 2010/0145820 A1* | 6/2010 | Johnson et al. ................. 705/27 |
| 2010/0157152 A1 | 6/2010 | Weitbruch et al. |
| 2010/0162303 A1 | 6/2010 | Cassanova |
| 2010/0218228 A1 | 8/2010 | Walter |
| 2011/0032191 A1 | 2/2011 | Cooke et al. |
| 2011/0063509 A1* | 3/2011 | Karaoguz et al. ............. 348/563 |
| 2011/0063523 A1 | 3/2011 | Karaoguz et al. |
| 2011/0066929 A1 | 3/2011 | Karaoguz et al. |
| 2011/0067062 A1 | 3/2011 | Karaoguz et al. |
| 2011/0067063 A1 | 3/2011 | Karaoguz et al. |
| 2011/0067064 A1 | 3/2011 | Karaoguz et al. |
| 2011/0067069 A1 | 3/2011 | Karaoguz et al. |
| 2011/0141013 A1 | 6/2011 | Matthews |
| 2011/0179435 A1 | 7/2011 | Cordray |
| 2012/0079525 A1 | 3/2012 | Ellis |
| 2012/0154268 A1 | 6/2012 | Alten |
| 2012/0163776 A1 | 6/2012 | Hassell et al. |
| 2013/0061269 A1* | 3/2013 | Johnson et al. ................. 725/60 |
| 2014/0101690 A1 | 4/2014 | Boncyk et al. |

FOREIGN PATENT DOCUMENTS

| | | |
|---|---|---|
| CN | 1329796 A | 1/2002 |
| WO | WO 99/04559 A1 | 1/1999 |
| WO | WO 2007/137611 | 12/2007 |
| WO | WO 2009/033500 A1 | 3/2009 |

OTHER PUBLICATIONS

Final Office Action from related U.S. Appl. No. 12/880,530 dated Jan. 14, 2013.
Final Office Action from related U.S. Appl. No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Final Office Action from related U.S. Appl. No. 12/880,888 dated Dec. 6, 2012.
Office Action from related U.S. Appl. No. 12/774,380 dated Jan. 8, 2013.
Final Office Action from related U.S. Appl. No. 12/880,965 dated Jan. 11, 2013.
Office Action from related U.S. Appl. No. 12/881,004 dated Nov. 1, 2012.
Final Office Action from related U.S. Appl. No. 12/881,067 dated Oct. 9, 2012.
Office Action from related U.S. Appl. No. 12/851,075 dated Sep. 5, 2012.
Office Action from related U.S. Appl. No. 12/774,221 dated Aug. 29, 2012.
Final Office Action from related U.S. Appl. No. 12/881,110 dated Oct. 17, 2012.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,321 dated Nov. 14, 2012.
Office Action from related U.S. Appl. No. 12/880,530 dated Aug. 2, 2012.
Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012,.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Final Office Action from related U.S. Appl. No. 12/774,154 dated Apr. 10, 2013.
Final Office Action from related U.S. Appl. No. 12/881,004 dated Mar. 7, 2013.
Final Office Action from related U.S. Appl. No. 12/851,036 dated Feb. 26, 2013.
Final Office Action from related U.S. Appl. No. 12/851,075 dated Mar. 5, 2013.
Non-Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,945 dated Apr. 26, 2013.
Final Office Action from related U.S. Appl. No. 12/774,321 dated Jun. 27, 2013.
Non-Final Office Action from related U.S. Appl. No. 12/774,154 dated Aug. 14, 2013.

(56) References Cited

OTHER PUBLICATIONS

Non-Final Office Action from related U.S. Appl. No. 12/850,945 dated Aug. 27, 2013.
Non-Final Office Action from related U.S. Appl. No. 12/880,668 dated Jun. 10, 2013.
Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.
Final Office Action from related U.S. Appl. No. 12/880,749 dated Jan. 13, 2015.
Non-Final Office Action from related U.S. Appl. No. 12/774,221 dated Jan. 28, 2015.
Non-Final Office Action from related U.S. Appl. No. 14/488,778 dated Jan. 2, 2015.
Non-Final Office Action from related U.S. Appl. No. 14/480,020 dated Dec. 31, 2014.
Non-Final Office Action from related U.S. Appl. No. 14/479,670 dated Dec. 19, 2014.
Final Office Action from related U.S. Appl. No. 12/881,031 dated Feb. 12, 2015.
Final Office Action from related U.S. Appl. No. 12/881,110 dated Feb. 18, 2015.
Non-Final Office Action from related U.S. Appl. No. 14/467,408 dated Dec. 17, 2014.
Non-Final Office Action from related U.S. Appl. No. 12/774,221 dated Sep. 20, 2013.
Non-Final Office Action from related U.S. Appl. No. 12/880,749 dated Oct. 4, 2013.
Non-Final Office Action from related U.S. Appl. No. 12/881,004 dated Oct. 30, 2013.
Non-Final Office Action from related U.S. Appl. No. 12/880,594 dated Oct. 22, 2013.
Final Office Action from related U.S. Appl. No. 12/880,668 dated Nov. 26, 2013.
Non-Final Office Action from related U.S. Appl. No. 12/880,888 dated Nov. 4, 2013.
Final Office Action from related U.S. Appl. No. 12/850,945 dated Dec. 16, 2013.
Final Office Action from related U.S. Appl. No. 12/774,154 dated Feb. 27, 2014.
Final Office Action from related U.S. Appl. No. 12/881,031 dated Mar. 6, 2014.
Final Office Action from related U.S. Appl. No. 12/880,749 dated Mar. 13, 2014.
Final Office Action from related U.S. Appl. No. 12/774,221 dated Jan. 29, 2014.
Final Office Action from related U.S. Appl. No. 12/880,851 dated Feb. 12, 2014.
Non-Final Office Action from related U.S. Appl. No. 12/774,321 dated Feb. 7, 2014.
Non-Final Office Action from related U.S. Appl. No. 12/850,832 dated Mar. 24, 2014.
Non-Final Office Action from related U.S. Appl. No. 12/851,075 dated Apr. 4, 2014.
Non-Final Office Action from related U.S. Appl. No. 12/881,110 dated Apr. 7, 2014.
Non-Final Office Action from related U.S. Appl. No. 12/880,530 dated Apr. 9, 2014.
Non-Final Office Action from related U.S. Appl. No. 12/774,380 dated Apr. 15, 2014.
Non-Final Office Action from related U.S. Appl. No. 12/881,067 dated May 9, 2014.
Final Office Action from related U.S. Appl. No. 12/774,321 dated Jun. 2, 2014.
Intel, "Intel Ethernet Switch Converged Enhanced Ethernet (CEE) and Datacenter Bridging (DCB)", White Paper, Feb. 2009, pp. 1-14.
Non-Final Office Action from related U.S. Appl. No. 12/881,031 dated Jul. 25, 2014.
Final Office Action from related U.S. Appl. No. 12/880,530 dated Aug. 18, 2014.
Non-Final Office Action from related U.S. Appl. No. 12/880,749 dated Jul. 30, 2014.
Non-Final Office Action from related U.S. Appl. No. 12/859,911 dated Aug. 14, 2014.
Non-Final Office Action from related U.S. Appl. No. 12/850,945 dated Jul. 25, 2014.
Non-Final Office Action from related U.S. Appl. No. 12/881,110 dated Sep. 17, 2014.
Non-Final Office Action from related U.S. Appl. No. 12/881,096 dated Sep. 22, 2014.
Final Office Action from related U.S. Appl. No. 12/851,075 dated Oct. 14, 2014.
Final Office Action from related U.S. Appl. No. 12/850,832 dated Oct. 7, 2014.
Non-Final Office Action from related U.S. Appl. No. 12/880,965 dated Sep. 30, 2014.
Non-Final Office Action from related U.S. Appl. No. 14/457,451 dated Nov. 20, 2014.
Non-Final Office Action from related U.S. Appl. No. 12/774,154 dated Nov. 13, 2014.
Non-Final Office Action from related U.S. Appl. No. 12/880,530 dated Mar. 31, 2015.
Final Office Action from related U.S. Appl. No. 12/881,096 dated Apr. 27, 2015.
Final Office Action from related U.S. Appl. No. 12/850,911 dated Mar. 20, 2015.
Final Office Action from related U.S. Appl. No. 12/880,965 dated Apr. 6, 2015.
Final Office Action from related U.S. Appl. No. 14/457,451 dated Apr. 29, 2015.
Final Office Action from related U.S. Appl. No. 14/480,020 dated May 8, 2015.
Final Office Action from related U.S. Appl. No. 14/467,408 dated May 7, 2015.
Final Office Action from related U.S. Appl. No. 14/488,778 dated May 19, 2015.
Non-Final Office Action from related U.S. Appl. No. 12/850,832 dated Jun. 3, 2015.
Final Office Action from related U.S. Appl. No. 14/479,670 dated Jun. 9, 2015.
Non-Final Office Action from related U.S. Appl. No. 14/625,810 dated Jun. 11, 2015.
Final Office Action from related U.S. Appl. No. 12/851,075 dated Jun. 8, 2015.

* cited by examiner

SYSTEM AND METHOD IN A TELEVISION RECEIVER FOR PROVIDING USER-SELECTION OF OBJECTS IN A TELEVISION PROGRAM

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/880,530, filed concurrently herewith, titled "SYSTEM AND METHOD IN A DISTRIBUTED SYSTEM FOR RESPONDING TO USER-SELECTION OF AN OBJECT IN A TELEVISION PROGRAM"; U.S. patent application Ser. No. 12/880,594, filed concurrently herewith, titled "SYSTEM AND METHOD IN A LOCAL TELEVISION SYSTEM FOR RESPONDING TO USER-SELECTION OF AN OBJECT IN A TELEVISION PROGRAM"; U.S. patent application Ser. No. 12/880,668, filed concurrently herewith, titled "SYSTEM AND METHOD IN A TELEVISION SYSTEM FOR RESPONDING TO USER-SELECTION OF AN OBJECT IN A TELEVISION PROGRAM BASED ON USER LOCATION"; U.S. patent application Ser. No. 12/881,067, filed concurrently herewith, titled "SYSTEM AND METHOD IN A TELEVISION SYSTEM FOR PRESENTING INFORMATION ASSOCIATED WITH A USER-SELECTED OBJECT IN A TELEVISION PROGRAM"; U.S. patent application Ser. No. 12/880,749, filed concurrently herewith, titled "SYSTEM AND METHOD IN A TELEVISION SYSTEM FOR RESPONDING TO USER-SELECTION OF AN OBJECT IN A TELEVISION PROGRAM UTILIZING AN ALTERNATIVE COMMUNICATION NETWORK"; U.S. patent application Ser. No. 12/851,036, filed concurrently herewith, titled "SYSTEM AND METHOD IN A TELEVISION SYSTEM FOR PROVIDING FOR USER-SELECTION OF AN OBJECT IN A TELEVISION PROGRAM"; U.S. patent application Ser. No. 12/851,075, filed concurrently herewith, titled "SYSTEM AND METHOD IN A PARALLEL TELEVISION SYSTEM FOR PROVIDING USER-SELECTION OF OBJECTS IN A TELEVISION PROGRAM"; U.S. patent application Ser. No. 12/880,851, filed concurrently herewith, titled "SYSTEM AND METHOD IN A TELEVISION FOR PROVIDING ADVERTISING INFORMATION ASSOCIATED WITH A USER-SELECTED OBJECT IN A TELEVISION PROGRAM"; U.S. patent application Ser. No. 12/880,888, filed concurrently herewith, titled "SYSTEM AND METHOD IN A TELEVISION FOR PROVIDING INFORMATION ASSOCIATED WITH A USER-SELECTED PERSON IN A TELEVISION PROGRAM"; U.S. patent application Ser. No. 12/881,110, filed concurrently herewith, titled "SYSTEM AND METHOD IN A TELEVISION FOR PROVIDING INFORMATION ASSOCIATED WITH A USER-SELECTED INFORMATION ELEMENT IN A TELEVISION PROGRAM". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television systems are incapable of providing for and/or conveniently providing for user-selection of objects in a television program. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a television receiver (e.g., external to a television) for providing for user selection of objects in a television program, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
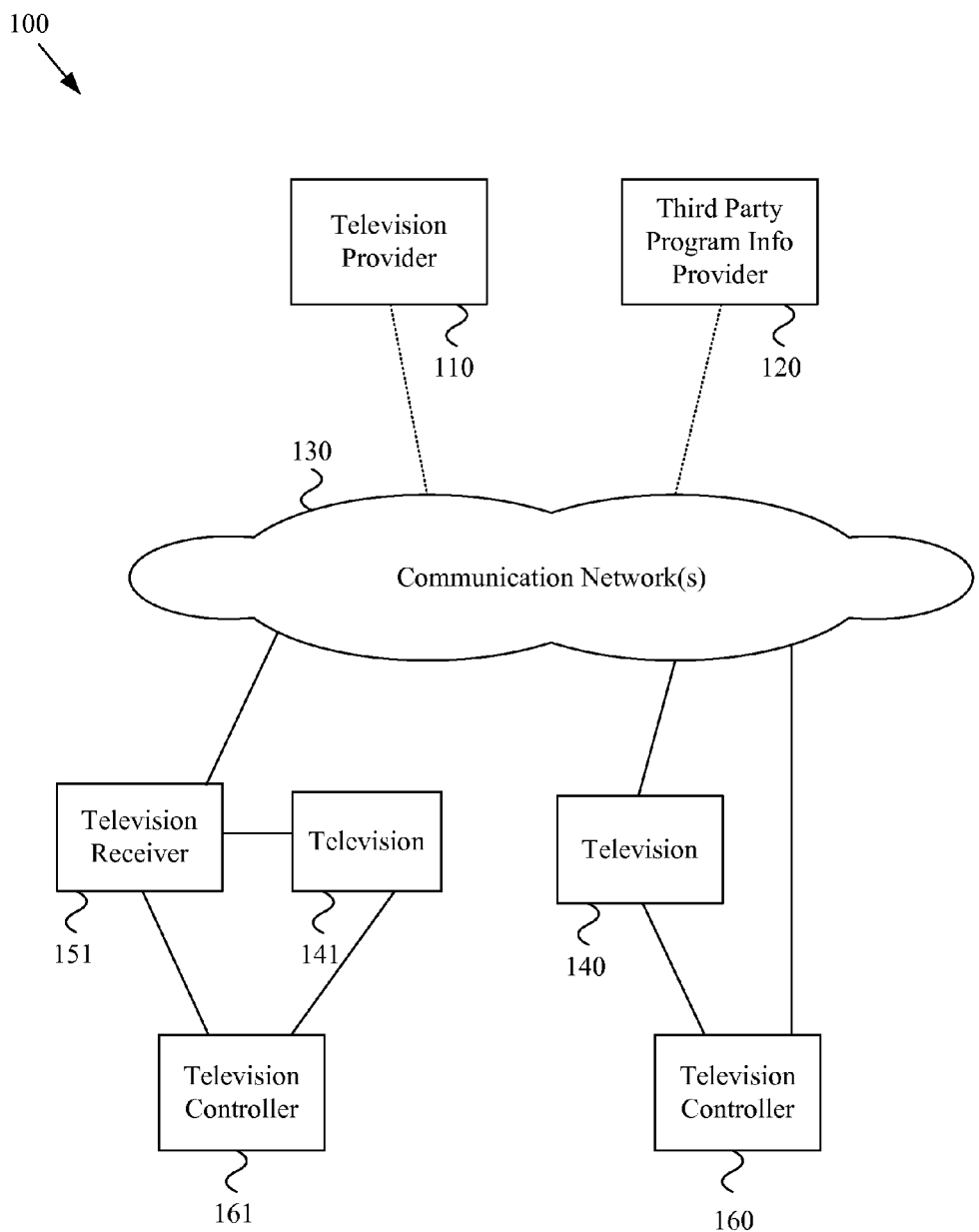
FIG. 1 is a diagram illustrating an exemplary television system, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television receiver modules). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion will at times refer to an on-screen pointing location. Such a pointing location refers to a location on the television screen to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing. Various aspects of the present invention, while referring to on-screen pointing location, are also readily extensible to such other forms of on-screen location identification.

Additionally, the following discussion will at times refer to television programming. Such television programming generally includes various types of television programming (e.g., television programs, news programs, sports programs, music television, movies, television series programs and/or associated advertisements, educational programs, live or recorded television programming, broadcast/multicast/unicast television programming, etc.). Such television programming may, for example, comprise real-time television broadcast programming (or multicast or unicast television programming) and/or user-stored television programming that is stored in a user device (e.g., a VCR, PVR, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example in a television receiver (e.g., a receiver external to a television), comprise receiving television programming, communicating the received television programming to a television for presentation to a user on the screen of the television, determining an on-screen pointing location pointed to by the user of the television, and identifying a user-selected object in the presented television programming.

Also, the following discussion will at times refer to user-selectable objects in television programming. Such user-selectable objects includes both animate (i.e., living) and inanimate (i.e., non-living) objects, both still and moving. Such objects may, for example, comprise characteristics of any of a variety of objects present in television programming. Such objects may, for example and without limitation, comprise inanimate objects, such as consumer good objects (e.g., clothing, automobiles, shoes, jewelry, furniture, food, beverages, appliances, electronics, toys, artwork, cosmetics, recreational vehicles, sports equipment, safety equipment, computer equipment, communication devices, books, etc.), premises objects (e.g., business locations, stores, hotels, signs, doors, buildings, landmarks, historical sites, entertainment venues, hospitals, government buildings, etc.), objects related to services (e.g., objects related to transportation, objects related to emergency services, objects related to general government services, objects related to entertainment services, objects related to food and/or drink services, etc.), objects related to location (e.g., parks, landmarks, streets, signs, road signs, etc.), etc. Such objects may, for example, comprise animate objects, such as people (e.g., actors/actresses, athletes, musicians, salespeople, commentators, reports, analysts, hosts/hostesses, entertainers, etc.), animals (e.g., pets, zoo animals, wild animals, etc.) and plants (e.g., flowers, trees, shrubs, fruits, vegetables, cacti, etc.).

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide television programming and non-programming information and/or video content. The television provider 110 may, for example, provide information related to a television program (e.g., information describing or otherwise related to selectable objects in television programming, etc.).

The exemplary television system 100 may also include a third party program information provider 120. Such a provider 120 may, for example, provide information related to a television program. Such information may, for example, comprise information describing selectable objects in programming, program guide information, etc.

The exemplary television system 100 may include one or more communication networks (e.g., the communication network(s) 130). The exemplary communication network 130 may comprise characteristics of any of a variety of types of communication networks over which television programming and/or information related to television programming (e.g., information identifying and/or describing and/or otherwise related to user-selectable objects in television programming) may be communicated. For example and without limitation, the communication network 130 may comprise characteristics of any one or more of: a cable television network, a satellite television network, a telecommunication network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.).

The exemplary television system 100 may include a first television controller 160. Such a first television controller 160 may, for example, operate to (e.g., which may include "operate when enabled to") control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, etc.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control television programming (or related information) being provided to the first television 140, or to conduct other transactions (e.g., business transactions, etc.).

As will be discussed in more detail later, the first television controller 160 may operate to communicate screen pointing information with the first television 140 and/or other devices. Also, as will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

The exemplary television system 100 may also include a television receiver 151. The television receiver 151 may, for example, operate to (e.g., which may include "operate when enabled to") provide a communication link between a television and/or television controller and a communication network and/or information provider. For example, the television receiver 151 may operate to provide a communication link between the second television 141 and the communication network 130, or between the second television 141 and the television provider 110 (and/or third party program information provider 120) via the communication network 130.

The television receiver 151 may comprise characteristics of any of a variety of types of television receivers. For example and without limitation, the television receiver 151 may comprise characteristics of a cable television receiver, a satellite television receiver, etc. Also for example, the television receiver 151 may comprise a data communication network modem for data network communications (e.g., with the Internet, a LAN, PAN, MAN, telecommunication network, etc.). The television receiver 151 may also, for example, comprise recording capability (e.g., programming recording and playback, etc.). The television receiver 151 may, for example, be a stand-alone entity or may, for example, be integrated into any of a variety of other devices (e.g., integrated into a DVR, DVD and/or Blueray player, integrated into a game box, integrated into a personal computer, integrated into a router and/or gateway, etc.). The television receiver 151 may, for example, operate to (which includes "operate when enabled to") perform any or all of the functionality discussed herein.

The exemplary television system 100 may include a second television controller 161. Such a second television controller 161 may, for example, operate to (e.g., which may include "operate when enabled to") control operation of the second television 141 and the television receiver 151. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, etc.

The second television controller 161 may, for example, operate to transmit signals directly to the second television 141 to control operation of the second television 141. The second television controller 161 may, for example, operate to transmit signals directly to the television receiver 151 to control operation of the television receiver 151. The second television controller 161 may additionally, for example, operate to transmit signals (e.g., via the television receiver 151 and the communication network 130) to the television provider 110 to control television programming (or related information) being provided to the television receiver 151, or to conduct other transactions (e.g., business transactions, etc.). The second television controller 161 may further, for example, operate to receive signals from the second television 141 and/or television receiver 151. Such signals may, for example, comprise signals communicating television programming, information identifying and/or describing user-selectable objects in television programming and/or any of a variety of other information to the second television controller 161.

As will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The second television controller 161 provides one non-limiting example of a device that a user may utilize to point to an on-screen location.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
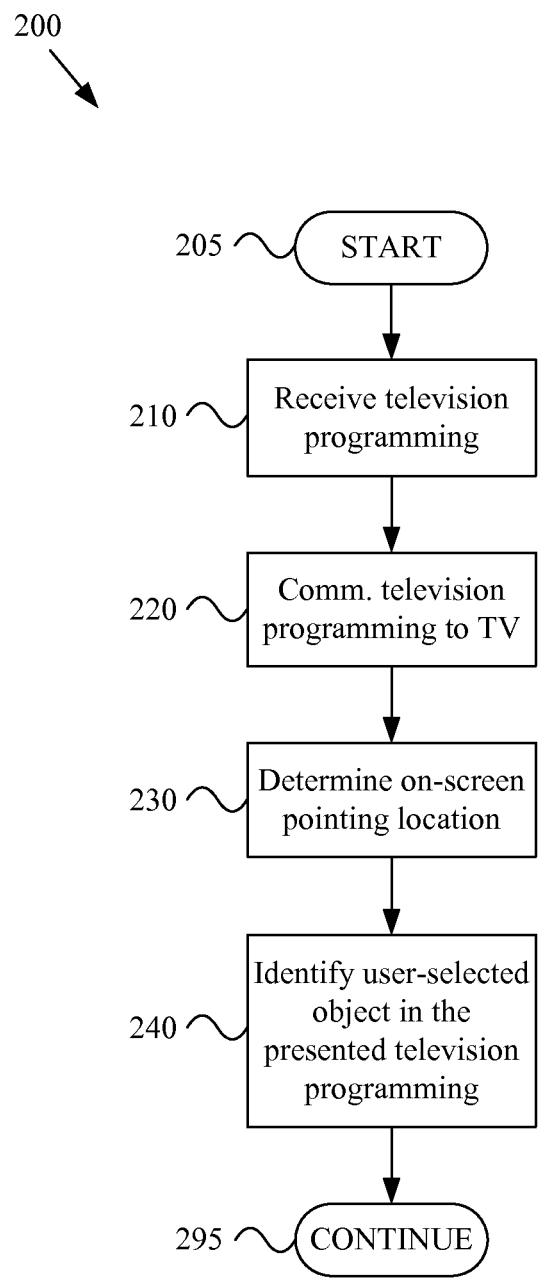
FIG. 2 is a flow diagram illustrating an exemplary method for providing user-selection of objects in television programming, in accordance with various aspects of the present invention.

FIG. 2 is a flow diagram illustrating an exemplary method 200 for providing user-selection of objects in television programming, in accordance with various aspects of the present invention. Any or all aspects of the exemplary method 200 may, for example, be implemented in a television receiver (e.g., external to a television), for example the television receiver 151 shown in FIG. 1 and discussed previously.

The exemplary method 200 may, for example, begin executing at step 205. The exemplary method 200 may begin executing in response to any of a variety of causes and/or conditions. For example, the exemplary method 200 may begin executing in response to a user command to begin, in response to user selection of a television program (or corresponding television channel) that includes user selectable objects, upon television receiver reset and/or power-up, in response to a user input indicating a desire to provide object selection capability to the user, in response to identification of a user and/or user equipment for which object selection capability is to be provided, in response to user payment of a fee, etc.

The exemplary method 200 may, for example at step 210, comprise receiving television programming. Many non-limiting examples of such television programming were provided above (e.g., television programming with user-selectable objects). Step 210 may comprise receiving the television programming from any of a variety of sources. For example and without limitation, step 210 may comprise receiving the television programming from a television broadcasting company, from a movie streaming company, from a user (or consumer) video recording device (e.g., internal and/or external to the television receiver), from an Internet television programming provider, etc.

Step 210 may also comprise receiving the television programming via any of a variety of types of communication networks. Such networks may, for example, comprise a wireless television network (e.g., terrestrial and/or satellite) and/or cable television network. Such networks may, for example, comprise any of variety of data communication networks (e.g., the Internet, a local area network, a personal area network, a metropolitan area network, etc.).

In general, step 210 may comprise receiving television programming. The scope of various aspects of the present invention should not be limited by characteristics of any particular television programming, television programming source, television programming network or manner of receiving television programming unless explicitly claimed.

The exemplary method 200 may, at step 220, comprise communicating television programming to a television (e.g., for presentation to a user on a screen of the television). Step 220 may, for example, comprise communicating the television programming received at step 210 to a television in any of a variety of manners. For example, step 220 may comprise communicating raw video data and/or decoded video data in one or more data signals, one or more television/display driver signals (e.g., composite and/or component video signals), etc. Also for example, step 220 may comprise communicating the television programming over any of a variety of communication media (e.g., wired, tethered optical, wireless RF, non-tethered optical, etc.). Further for example, step 220 may comprise communicating the television programming to another video presentation device external to the television.

The communicated television programming may, for example, comprise user-selectable objects in the television programming. Many non-limiting examples of such user-selectable objects were presented above. In general, such user-selectable objects may, for example, comprise animate and/or inanimate objects in television programming that a user may select (e.g., using a pointing device or other user interface by which a user may specify a screen location). Information of such user-selectable objects may be received by a television receiver and retained for processing by the television receiver and/or communicated to the television as part of the television programming or separate from the television programming (e.g., via a data interface separate from a television programming interface).

The exemplary method 200 may, at step 230, comprise determining an on-screen pointing location pointed to by a user of the television receiver and/or television. Step 230 may comprise determining an on-screen pointing location in any of a variety of manners, non-limiting examples of which will now be provided. Various non-limiting examples of on-screen pointing location determining are provided in U.S. Provisional Application No. 61/242,234, which is hereby incorporated herein by reference in its entirety. An on-screen pointing location may, for example, be expressed in a screen-centric coordinate system (e.g., x-y pixel coordinates), a screen independent coordinate system (e.g., based on location within a moving image, where such location is generic to all television screens), a world coordinate and/or universal coordinate system, a video frame-based coordinate system, etc.

Step 230 may, for example, comprise the television receiver analyzing sensor information (e.g., associated with sensors on-board and/or off-board the television and/or television receiver) to determine user on-screen pointing location. Step 230 may also, for example, comprise the television receiver receiving information describing the on-screen pointing location from a device external to the television receiver (e.g., the television, a television controller, a television network device, a user pointing device, etc.).

Step 230 may, for example, comprise identifying a timestamp temporally identifying the instance of a determined on-screen pointing location. Such timestamp may, for example, be obtained by a clock, timestamp embedded in a video stream, timestamp embedded in a stream including object information, timestamp associated with a signal transmitted from a user pointing device, etc. Determination of such a timestamp may, for example, be based on user command (e.g., a user indicating that a selection has occurred) or automatically without a direct indication from the user that a selection has occurred (e.g., the system determining that the user has pointed to an object for at least a particular amount of time), etc. Such timestamp may be utilized, for example, for determining selection of a moving, changing and/or temporally transient object in the television programming.

In general, step 230 may comprise determining an on-screen pointing location pointed to by a user of the television receiver and/or television. Accordingly, the scope of various aspects of the present invention should not be limited by characteristics of any particular type of on-screen pointing location or any particular manner of determining such an on-screen pointing location unless explicitly claimed.

The exemplary method 200 may, at step 240, comprise identifying a user-selectable object in the television programming (e.g., the television programming communicated at step 220) at which the user is pointing based, at least in part, on the determined on-screen pointing location (e.g., as determined at step 230). Step 240 may comprise performing such identifying in any of a variety of manners, non-limiting examples of which will now be presented.

For example, step 240 may comprise determining the on-screen location and/or dimensions of one or more user-selectable objects (e.g., or associated selection region) in the television programming, and identifying a user-selected object by analyzing the respective on-screen locations of the one or more user-selectable objects and the determined on-screen pointing location (e.g., at a particular time instance and/or particular timeframe) to determine the television programming object selected by the user. For example, such on-screen location may, for example, comprise the on-screen location of one or more points, areas and/or volumes associated with respective locations of user-selectable objects.

In such an exemplary scenario or any scenario involving determining on-screen location of one or more objects in the presented television programming, step 240 may, for example, comprise determining such on-screen object location in any of a variety of manners. For example, step 240 may comprise receiving information identifying and/or describing the user-selectable objects in the television program.

For example, step 240 may comprise receiving information identifying and/or describing such user-selectable objects from the same source as the received television programming. For example, step 240 may comprise receiving such information embedded in a same data stream as a stream communicating the television programming to the television receiver (e.g., embedded in the received television program data). For example, a television stream protocol may comprise specialized elements (and/or the utilization of unassigned elements) that include information about selectable objects (e.g., object identity, shape, location, size, coloration, movement characteristics, timing, appearance time window, etc.).

Also for example, step 240 may comprise receiving the information identifying and/or describing such user-selectable objects in a data stream communicated in parallel with a stream communicating the presented television programming. In such a scenario, the television program stream and object information stream may be received (e.g., by the television receiver) from a same source over a same television programming communication channel. Additionally for example, step 240 may comprise receiving such information from a same source but over a communication channel different from the channel over which the television programming is received and/or over a type of communication channel different from a television programming communication channel.

Further for example, step 240 may comprise receiving the information identifying and/or describing such user-selectable objects from a source (e.g., a third party information provider, a television network source, etc.) different from the source from which the television programming is received. In such an exemplary scenario, step 240 may comprise receiving such information via different respective communication networks or via one or more same communication networks. Also for example, step 240 may comprise receiving such information over a different communication medium than that over which the television programming is received.

Step 240 may, for example, comprise receiving the information identifying and/or describing such user-selectable objects in a data stream, where such information is always transmitted in the data stream (e.g., whether or not requested by a user and/or other system). Alternatively for example, step 240 may comprise receiving such information, where such information is communicated (e.g., to the television) only when requested (e.g., only when requested by the television receiver, by a television controller, by a television, by a user electronic device, by the user, etc.).

Step 240 may, for example, comprise receiving the information identifying and/or describing such user-selectable objects in real-time (i.e., as the television programming is received). Also for example, step 240 may comprise receiving such information from a source of user-stored television programming. For example, such information may be stored with stored television programming in a user storage device (e.g., in a same data file, in separate but related files, etc.). In such an exemplary implementation, such information may be received from the user's television programming storage device in time synchronization with television programming.

As mentioned above, the information identifying and/or describing user selectable objects in television programming may comprise timing information associated with such selectable objects. For example, movement of a selectable object may be expressed as a function of time. Also for example, appearance of a selectable object in television programming may be associated with a time window during which such object appears. As will be discussed in more detail below, timing associated with a user on-screen pointing (or object selection) event may be synchronized to the timing of selectable object location in a television program to determine whether a user pointed to (or selected) a particular object at a particular location at a particular time.

The information identifying and/or describing user selectable objects in television programming may comprise information defining respective regions of the presented television programming that are associated with respective user-selectable objects in the presented television programming. For example, such information may comprise information describing respective geometric shapes (e.g., 2-D and/or 3-D geometric constructs) associated with respective user-selectable objects. For example, a circle, oval, square, rectangle, pentagon or any polygon may be associated with a user-selectable object. User-selection of one of such geometric shapes (e.g., a determined on-screen pointing location within the boundaries of such geometric shape(s) at the relevant point in time) may indicate user selection of the respective object.

As discussed above, the object description (whether geometric or not) may comprise information (e.g., temporal information) describing movement, appearance, size changing, shape changing, etc. associated with the user-selectable object. For example, in an exemplary scenario where a plurality of geometric shapes are utilized to describe a user-selectable object (and/or a user-selectable area associated with such object), the description of the user-selectable object may comprise information describing the manner in which each of the respective objects move in the programming (e.g., as a function of time, as a function of video frame number, etc.) and/or information describing the manner in which dimensions of each of the respective objects change.

Once on-screen pointing location and object location (e.g., at a particular point in time) are known, such information may be processed to determine a user-selectable object to which a user is pointing. As mentioned above, such processing may comprise determining a respective region of the television screen and/or a television programming frame associated with a respective user-selectable object, where the respective region correlates to an on-screen pointing location pointed to by the user (e.g., at a particular point in time or during a particular timeframe).

During performing such processing, step 240 may comprise low-pass filtering the determined on-screen pointing location (e.g., as determined at step 230) to compensate for unintended movement of pointing location (e.g., due to unsteady or unstable user pointing), thus increasing reliability of object selection determination. For example, successful user-selection of a television programming object may require a user to point to an on-screen object for a particular amount of time (or for a particular number of frames).

Note that such low-pass filtering may also be performed at step 230. Such filtering may, for example, comprise filtering over a particular period of time, over a particular number of on-screen pointing direction determinations, over a particular number of television programming frames, etc. Such filtering may comprise averaging a plurality of on-screen pointing direction determinations, utilizing a finite impulse response filtering scheme, etc.

Step 240 may also, for example, comprise identifying a user-selected object by identifying a most likely object selected by the user. For example, step 240 may comprise identifying a closest user-selectable object to the on-screen pointing location determined at step 230. Also for example, step 240 may comprise determining a most likely user-selected object based, at least in part, on respective popularity of user selectable objects (e.g., favoring the most often selected inanimate and/or animate objects). Additionally for example, step 240 may comprise identifying a most likely user-selected object based, at least in part, on monetary considerations (e.g., placing a higher likelihood on user-selectable objects associated with relatively higher paying advertisers, placing a higher likelihood on user-selectable objects associated with a per-selection based advertising fee, etc.). Further for example, step 240 may comprise identifying a most likely user-selected programming object based on history of selection from a particular user (e.g., favoring types of objects most often selected by a particular user). Also for example, step 240 may comprise identifying a most likely user-selected programming object based on object newness (e.g., a new object is likely to garner more interest than an object that has been shown for a relatively long period of time). Additionally, for example, step 240 may comprise identifying a most likely user-selected television programming object based on object size.

A selected object may be identified with a unique identifier (e.g., unique to the object, unique to a group of related objects, etc.). Step 240 may thus comprise determining the identifier associated with the determined user-selected object. Such identifier may then be utilized in the performance of any of a variety of further functions, non-limiting examples of which will be presented below. For example, the information identifying and/or describing a user-selectable object may comprise information describing functions associated with such object (e.g., information presentation functionality, communication functionality, business transaction functionality, user interaction functionality, etc.).

The steps of the exemplary method 200 (or aspects thereof) may, for example, be performed (e.g., by a television receiver) in real-time. In such manner, the user may have relatively expeditious access to functionality associated with the user-selected object. Alternatively for example, the exemplary method 200 (or aspects thereof) may be performed off-line in a manner in which functionality associated with the user-selected object is provided to the user at a later time (e.g., after presentation of the television program, upon the user pausing presentation of the television program, upon the user logging into the user's computer system, upon the user accessing email, etc.).

As mentioned above, any or all of the steps of the exemplary method 200 may be performed for user selection of an object in television programming as the programming is broadcast in real-time and/or may be performed for user selection of an object in television programming that has been recorded on a user (or home) television programming recorder (e.g., a personal video recorder (PVR), video cassette recorder (VCR), etc.) and is currently being communicated to the television for presentation to the user (e.g., at step 220) in a time-shifted manner. For example, a user may record a broadcast television program on a PVR for later viewing, view such recorded programming at a later time, and while viewing such time-shifted television programming at a later time, select user-selectable objects in such programming.

Similarly, any or all of the steps of the exemplary method 200 may be performed for user selection of an object in television programming that has been provided to the user (or stored by the user) on a physical storage medium (e.g., on a digital versatile disc (DVD), video cassette recorder tape, non-volatile memory device, etc.). For example, a user may purchase a set of DVDs including all episodes of a season of a television series, view each of such episodes at the convenience of the user, and while viewing such episodes, select user-selectable objects in such programming. In such a scenario, a system (e.g., a television receiver) implementing the method 200 may receive the television programming and/or object information from a television program record and playback device (e.g., on-board and/or off-board a television receiver).

In an exemplary scenario where on-screen pointing location at a particular point in time is utilized to determine object selection, any of a variety of time references may be utilized. For example, synchronization of on-screen pointing location and user-selectable object location (e.g., on-screen and/or in-frame location) may be based on a presentation timestamp (PTS) and/or a decoding timestamp (DTS), or the like, which may be encoded in a broadcast and/or recorded television program or determined as such program is being communicated to a television or presented to a user. In such a scenario, so long as the object location and pointing determination are based on a common and/or synchronized time reference, the identification of a pointed-to object may be performed accurately.

As mentioned previously, object information identifying and/or describing user-selectable objects may be received encoded in a video program stream or may be received in a separate stream (and/or channel). In a scenario where television programming information is stored (either short term or long term), the object information may also be stored (e.g., with the stored programming information in a same data file, in a separate but related data file, etc.). Such storage may, for example, be housed in a same housing as a television receiver implementing the method and/or in a separate housing. In such a manner, when the user determines to view a time-shifted program, the object information is accessible to the television receiver.

Alternatively, such information identifying and/or describing user-selectable objects in television programming may be requested from a third party when such information is needed. In yet another scenario, for example, where video information may be decoded separately from the television receiver (e.g., in a separate set top box (STB), cable and/or satellite television receiver, PVR, personal computer, etc.) and communicated to the television receiver, such object information may also be received by such separate device and provided to the television receiver (e.g., in an information channel separate from a television programming information channel).

Note that although a portion of the previous discussion concerned analyzing on-screen pointing location and on-screen object location to identify a user-selected object, such analysis may also be similarly performed by analyzing on-frame pointing location and on-frame object location. In other words, such analysis may comprise performing any of a variety of coordinate transformations to perform such analysis in any of a variety of different respective coordinate domains.

In general, step 240 may comprise identifying a user-selectable object in the presented television programming at which the user is pointing (e.g., based, at least in part, on the determined on-screen pointing location (e.g., as determined at step 230)). Accordingly, the scope of various aspects of the present invention should not arbitrarily be limited by any particular manner of performing such identifying unless explicitly claimed.

The exemplary method 200 may, for example at step 295, comprise performing continued operations. Step 295 may comprise performing any of a variety of continued operations, non-limiting examples of such continued operation(s) will be presented below. For example, step 295 may comprise returning execution flow to any of the previously discussed method steps. For example, step 295 may comprise returning execution flow of the exemplary method 200 to step 230 for determining additional on-screen pointing locations and corresponding user-selected objects in the television programming.

Also for example, step 295 may comprise generating a signal comprising characteristics (e.g., non-data characteristics, analog characteristics, digital characteristics, data, etc.) adapted to cause the television to generate a user output indicating the identified user-selectable object (e.g., as identified at step 240). For example, such a generated signal may comprise characteristics adapted to cause the television to overlay a graphical feature coinciding with the identified user-selectable object on the television programming as the television programming is presented to the user. For example, as discussed above, a user-selectable object (and/or the user-selectable portion of a user-selectable object) may be defined by one or more geometric shapes. In such an exemplary scenario, step 295 may comprise generating a signal comprising characteristics adapted to cause the television to highlight such geometric shapes (or the borders thereof) when step 240 determines that the user has selected a user-selectable object associated with such geometric shapes. Also for example, step 295 may comprise generating a signal comprising characteristics adapted to cause the television to present an outline of the identified object on the television screen, temporarily brighten or alter the color of the identified object, temporarily display a message on the screen as an indication of the identified object, etc. Step 295 may also, for example, comprise outputting an audio indication that a user-selected object has been identified and/or generating a signal comprising characteristics that cause another device (e.g., a television) to output such an audio indication.

Additionally for example, step 295 may comprise communicating information indicating the identified user-selectable object to a device other than a television external to the television receiver (e.g., a user device at the same premises as the television receiver and/or a device communicatively coupled to the television receiver via a communication network). For example, step 295 may comprise communicating such information to a television remote control device (e.g., in a scenario where the television remote control device may provide the user an indication of the identified user-selectable object). In such an exemplary scenario, the television remote control device may comprise a video screen on which the television program may be displayed, and the identified user-selectable object may then be graphically indicated on such video screen (e.g., instead of being identified on a screen of the television and/or in addition to being identified on the screen of the television).

Further for example, step 295 may comprise processing information of an identified user-selected object (e.g., as determined at step 240) to determine an action to perform with regard to such selected object. Various non-limiting examples of such actions are provided in U.S. Provisional Application No. 61/242,234, which is hereby incorporated herein by reference in its entirety.

In general, step 295 may comprise performing continued operations (e.g., performing additional operations corresponding to a user-selected television programming object, repeating various method steps for additional user-selected objects, etc.). Accordingly, the scope of various aspects of the present invention should not be limited by characteristics of any particular type of continued processing unless explicitly claimed.

Figure 3:
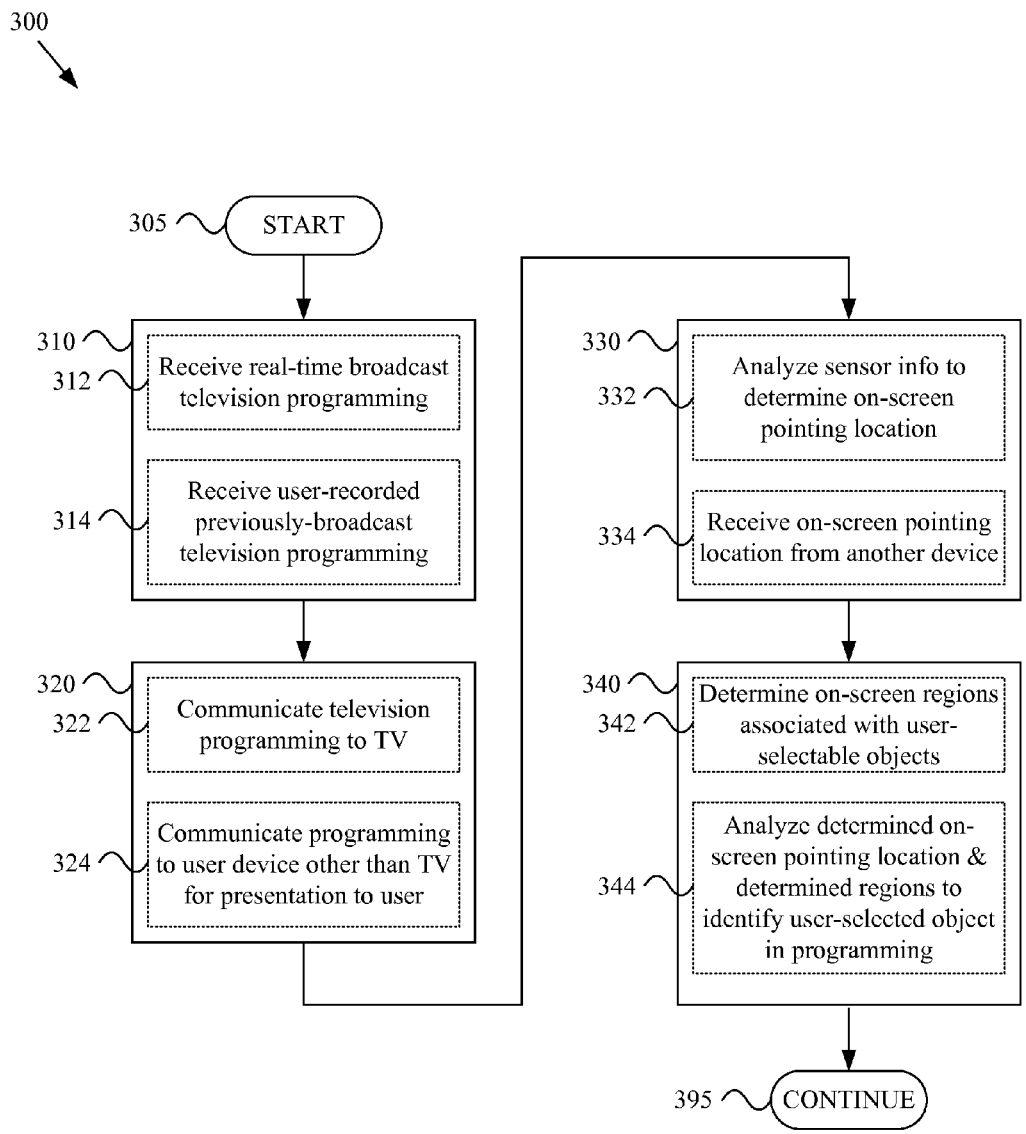
FIG. 3 is a flow diagram illustrating an exemplary method for providing user-selection of objects in television programming, in accordance with various aspects of the present invention.

Turning next to FIG. 3, such figure is a flow diagram illustrating an exemplary method 300 for providing user-selection of objects in television programming, in accordance with various aspects of the present invention. The exemplary method 300 may, for example, share any or all characteristics with the exemplary method 200 illustrated in FIG. 2 and discussed previously. Any or all aspects of the exemplary method 300 may, for example, be implemented in a television receiver (e.g., external to a television), for example the television receiver 151 shown in FIG. 1 and discussed previously.

The exemplary method 300 may, for example, begin executing at step 305. The exemplary method 300 may begin executing in response to any of a variety of causes or conditions. Step 305 may, for example, share any or all characteristics with step 205 of the exemplary method 200 illustrated in FIG. 2 and discussed previously.

The exemplary method 300 may, for example at step 310, comprise receiving television programming. Step 310 may, for example, share any or all characteristics with step 210 of the exemplary method 200 illustrated in FIG. 2 and discussed previously.

For example, step 310 may comprise, for example at sub-step 312, receiving a television program broadcast as such program is broadcast in real-time. Alternatively for example, step 310 may comprise, for example at sub-step 314, receiving a previously broadcast program from a user recording device (e.g., a PVR, VCR, etc.) in a time-shifted manner.

The exemplary method 300 may, for example at step 320, comprise communicating television programming (e.g., as received at step 310) to a television (e.g., for presentation to a user on a screen of the television). Step 320 may, for example, share any or all characteristics with step 220 of the exemplary method 200 illustrated in FIG. 2 and discussed previously.

For example, step 320 may comprise, for example at sub-step 322, communicating the received television programming to a television (e.g., of a television communicatively coupled to a television receiver implementing the exemplary method 300 or a portion thereof). Alternatively for example, step 320 may comprise, for example at sub-step 324, communicating received television programming to another user device (e.g., different from a television) for presentation to the user (e.g., to a display device different from the television, to a television remote control device with a display, to a user's handheld computer, etc.).

The exemplary method 300 may, for example at step 330, comprise determining on-screen pointing location pointed to by a user of the television and/or television receiver. Step 330 may, for example, share any or all characteristics with step 230 of the exemplary method 200 illustrated in FIG. 2 and discussed previously.

For example, step 330 may comprise, for example at sub-step 332, analyzing sensor information (e.g., associated with sensors on-board and/or off-board the television and/or television receiver) to determine user on-screen pointing location. Alternatively for example, step 330 may comprise, for example at sub-step 334, the television receiver receiving information describing the on-screen pointing location from a device external to the television receiver (e.g., the television, a television controller, a television network device, etc.).

The exemplary method 300 may, for example at step 340, comprise identifying a user-selectable object in the television programming (e.g., the television programming communicated at step 320) at which the user is pointing based, at least in part, on the determined on-screen pointing location (e.g., as determined at step 330). Step 340 may, for example, share any or all characteristics with step 240 of the exemplary method 200 illustrated in FIG. 2 and discussed previously.

For example, step 340 may comprise, for example at sub-step 342, determining the on-screen location of one or more user-selectable objects in the television programming. Alternatively for example, step 330 may comprise, for example at sub-step 344, identifying a user-selected object by analyzing the respective on-screen locations of the one or more user-selectable objects and the determined on-screen pointing location (e.g., at a particular time instance and/or particular timeframe) to determine the object selected by the user.

The exemplary method 300 may, for example at step 395, comprise performing continued operations. Step 395 may, for example, share any or all characteristics with step 295 of the exemplary method 200 illustrated in FIG. 2 and discussed previously.

Figure 4:
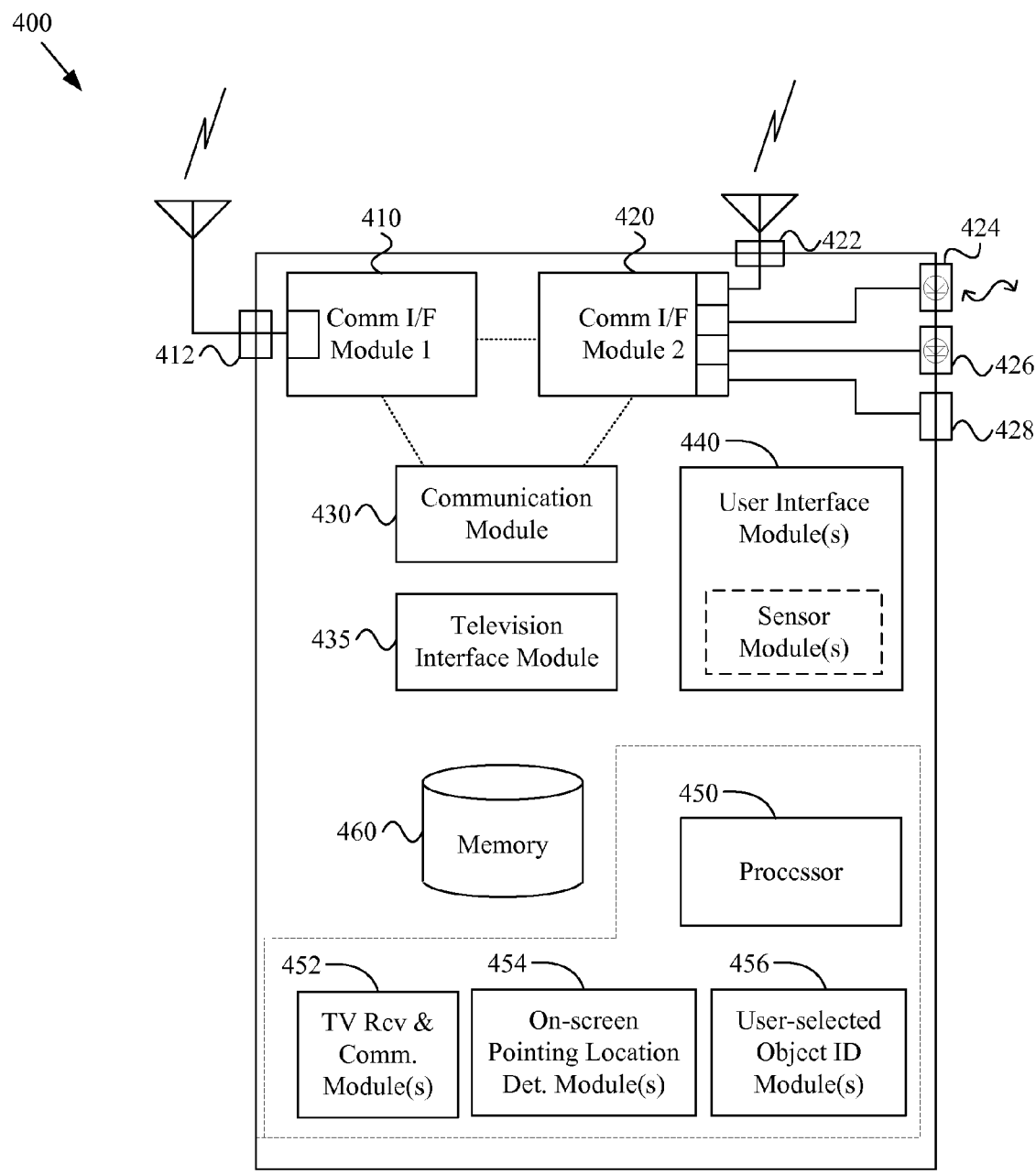
FIG. 4 is a diagram illustrating an exemplary television receiver, in accordance with various aspects of the present invention.

Turning next to FIG. 4, such figure is a diagram illustrating an exemplary television receiver 400, in accordance with various aspects of the present invention. The exemplary television receiver 400 may, for example, share any or all characteristics with the exemplary television receiver 151 illustrated in FIG. 1 and discussed previously. Also, the exemplary television receiver 400 (e.g., various modules thereof) may operate to perform any or all of the functionality discussed previously with regard to the exemplary methods 200 and 300 illustrated in FIGS. 2-3 and discussed previously.

The exemplary television receiver 400 includes a first communication interface module 410. The first communication interface module 410 may, for example, operate to communicate over any of a variety of communication media and utilizing any of a variety of communication protocols. For example, though the first communication interface module 410 is illustrated coupled to a wireless RF antenna via a wireless port 412, the wireless medium is merely illustrative and non-limiting. The first communication interface module 410 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication interface module 410 may operate to communicate with local sources of television video content (e.g., video recorders, receivers, gaming devices, etc.). Additionally, for example, the first communication interface module 410 may operate to communicate with a television controller (e.g., directly or via one or more intermediate communication networks).

The exemplary television receiver 400 includes a second communication interface module 420. The second communication interface module 420 may, for example, operate to communicate over any of a variety of communication media and utilizing any of a variety of communication protocols. For example, the second communication interface module 420 may communicate via a wireless RF communication port 422 and antenna, or may communicate via a non-tethered optical communication port 424 (e.g., utilizing laser diodes, photodiodes, etc.). Also for example, the second communication interface module 420 may communicate via a tethered optical communication port 426 (e.g., utilizing a fiber optic cable), or may communicate via a wired communication port 428 (e.g., utilizing coaxial cable, twisted pair, HDMI cable, Ethernet cable, any of a variety of wired component and/or composite video connections, etc.). The second communication interface module 420 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication interface module 420 may operate to communicate with local sources of television video content (e.g., video recorders, receivers, gaming devices, etc.). Additionally, for example, the second communication interface module 420 may operate to communicate with a television controller (e.g., directly or via one or more intervening communication networks).

The exemplary television receiver 400 may also comprise additional communication interface modules, which are not illustrated. Such additional communication interface modules may, for example, share any or all aspects with the first 410 and second 420 communication interface modules discussed above.

The exemplary television receiver 400 may also comprise a communication module 430. The communication module 430 may, for example, operate to control and/or coordinate operation of the first communication interface module 410 and the second communication interface module 420 (and/or additional communication interface modules as needed). The communication module 430 may, for example, provide a convenient communication interface by which other components of the television receiver 400 may utilize the first 410 and second 420 communication interface modules. Additionally, for example, in an exemplary scenario where a plurality of communication interface modules are sharing a medium and/or network, the communication module 430 may coordinate communications to reduce collisions and/or other interference between the communication interface modules.

The exemplary television receiver 400 may additionally comprise one or more user interface modules 440. The user interface module 440 may generally operate to provide user interface functionality to a user of the television receiver 400. For example, and without limitation, the user interface module 440 may operate to provide for user control of any or all standard television receiver commands (e.g., channel control, on/off, input selection, programming, recording/playback control, etc.). The user interface module 440 may, for example, operate and/or respond to user commands utilizing user interface features disposed on the television receiver 400 (e.g., buttons, etc.) and may also utilize the communication module 430 (and/or first 410 and second 420 communication interface modules) to communicate with a television controller (e.g., a dedicated television remote control, a universal remote control, a cellular telephone, personal computing device, gaming controller, etc.). Further for example, the user interface module 440 may utilize the communication module 430 (and/or first 410 and/or second 420 communication interface modules) to communicate with a television to utilize the user interface features of the television (e.g., to interface with a user of the television receiver 400).

The user interface module 440 may also comprise one or more sensor modules that operate to interface with and/or control operation of any of a variety of sensors that may be utilized to ascertain an on-screen pointing location. For example and without limitation, the user interface module 440 (or sensor module(s) thereof) may operate to receive signals associated with respective sensors (e.g., raw or processed signals directly from the sensors, through intermediate devices, via the communication interface modules 410, 420, etc.). Also for example, in scenarios in which such sensors are active sensors (as opposed to purely passive sensors), the user interface module 440 (or sensor module(s) thereof) may operate to control the transmission of signals (e.g., RF signals, optical signals, acoustic signals, etc.) from such sensors. Additionally, the user interface module 440 may perform any of a variety of video output functions (e.g., in an exemplary scenario where the television receiver 400 has an onboard display, in an exemplary scenario where the television receiver 400 is utilizing a display of another device, etc.).

The exemplary television receiver 400 may comprise one or more processors 450. The processor 450 may, for example, comprise a general purpose processor, digital signal processor, application-specific processor, microcontroller, microprocessor, etc. For example, the processor 450 may operate in accordance with software (or firmware) instructions. As mentioned previously, any or all functionality discussed herein may be performed by a processor executing instructions. For example, though various modules are illustrated as separate blocks or modules in FIG. 4, such illustrative modules, or a portion thereof, may be implemented by the processor 450.

The exemplary television receiver 400 may comprise one or more memories 460. As discussed above, various aspects may be performed by one or more processors executing instructions. Such instructions may, for example, be stored in the one or more memories 460. Such memory 460 may, for example, comprise characteristics of any of a variety of types of memory. For example and without limitation, such memory 460 may comprise one or more memory chips (e.g., ROM, RAM, EPROM, EEPROM, flash memory, one-time-programmable OTP memory, etc.), hard drive memory, CD memory, DVD memory, etc.

The exemplary television receiver 400 may comprise one or more modules 452 that operate to perform and/or manage the receipt and/or communication of television programming. For example, such one or more modules 452 may operate to utilize the communication module 430 (e.g., and at least one of the communication interface modules 410, 420) to receive and/or communicate television programming. For example, such one or more modules 452 may operate to perform step 210 of the exemplary method 200 discussed previously and/or step 310 of the exemplary method 300 discussed previously.

Also for example, such one or more modules 452 may operate to utilize the communication module 430 (and/or first 410 and/or second 420 communication interface modules) to communicate television programming to a television for presentation to a user. Additionally for example, such one or more modules 452 may operate to utilize the communication module 430 (e.g., and at least one of the communication interface modules 410, 420) to communicate television programming or other video output information to one or more devices communicatively coupled to the television receiver 400 (e.g., devices other than a television). For example, such one or more modules 452 may operate to perform step 220 of the exemplary method 200 discussed previously and/or step 320 of the exemplary method 300 discussed previously.

The exemplary television receiver 400 may comprise one or more on-screen pointing location determination module(s) 454. Such on-screen pointing location determination module(s) 454 may, for example, operate to determine an on-screen pointing location pointed to by a user of the television receiver and/or a television communicatively coupled thereto. Such module(s) 454 may, for example, operate to perform step 230 of the exemplary method 200 and/or step 330 of the exemplary method 300 discussed previously. For example, the module(s) 454 may operate to analyze sensor information to determine an on-screen pointing location. Also for example, the module(s) 454 may operate to receive on-screen pointing location information from a device (e.g., a television, a television controller, a television network device, a user pointing device, etc.) external to the television receiver 400 (e.g., utilizing the communication module 430).

The exemplary television receiver 400 may comprise one or more user-selected object identification modules 456. Such module(s) 456 may, for example, operate to identify a user-selectable object in television programming at which a user of the television receiver 400 and/or a television communicatively coupled thereto is pointing. For example, such module(s) 456 may operate to identify such user-selected object based, at least in part, on on-screen pointing location determined by the on-screen pointing location determination module(s) 454. Such module(s) 456 may, for example, operate to perform step 240 of the exemplary method 200 and/or step 340 of the exemplary method 300 discussed previously. For example, the module(s) 456 may operate to determine the on-screen location of one or more user-selectable objects in the television programming, and identify a user-selected object by analyzing the respective on-screen locations of the one or more user-selectable objects and the determined on-screen pointing location or in-frame pointing location (e.g., at a particular time instance and/or particular timeframe) to determine the object selected by the user.

Though not illustrated, the exemplary television receiver 400 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 452, 454 and 456) may be performed by the processor(s) 450 executing instructions stored in the memory 460.

Figure 5:
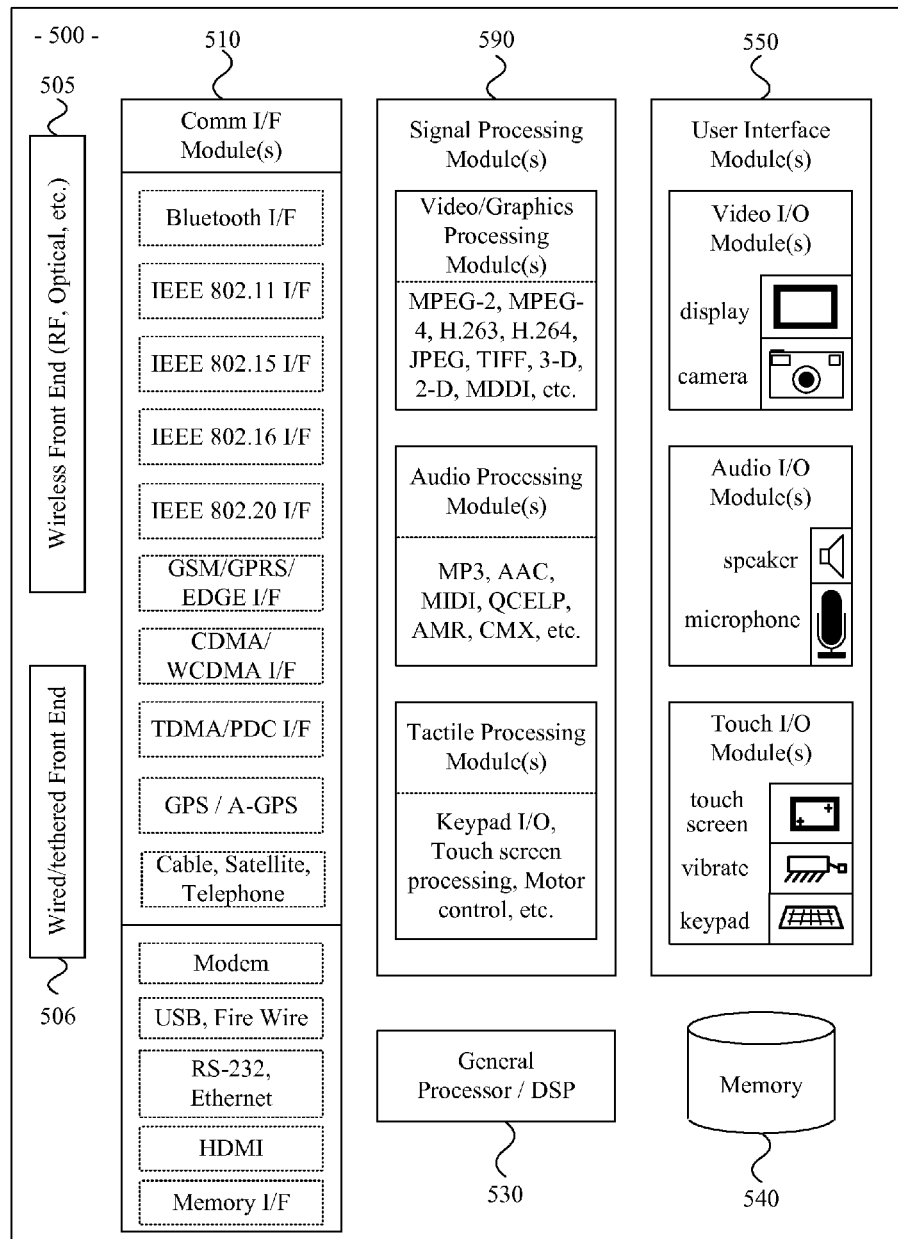
FIG. 5 is a diagram illustrating exemplary modules and/or sub-modules for a television receiver, in accordance with various aspects of the present invention.

Turning next to FIG. 5, such figure is a diagram illustrating exemplary modules and/or sub-modules for a television receiver 500, in accordance with various aspects of the present invention. The exemplary television receiver 500 may share any or all aspects with any of the television receivers 151 and 400 discussed herein and illustrated in FIGS. 1 and 4. For example, the exemplary television receiver 500 (or various modules thereof) may operate to perform any or all functionality discussed herein with regard to the exemplary method 200 illustrated in FIG. 2 and the exemplary method 300 illustrated in FIG. 3. As with the exemplary television receiver 400, the components of the exemplary television receiver 500 may be disposed in a single television receiver (e.g., a cable television receiver, a satellite television receiver, an Internet television receiver, etc.).

For example, the television receiver 500 comprises a processor 530. Such a processor 530 may, for example, share any or all characteristics with the processor 450 discussed with regard to FIG. 4. Also for example, the television receiver 500 comprises a memory 540. Such memory 540 may, for example, share any or all characteristics with the memory 460 discussed with regard to FIG. 4.

Also for example, the television receiver 500 may comprise any of a variety of user interface module(s) 550. Such user interface module(s) 550 may, for example, share any or all characteristics with the user interface module(s) 440 discussed previously with regard to FIG. 4. For example and without limitation, the user interface module(s) 550 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary television receiver 500 may also, for example, comprise any of a variety of communication modules (505, 506, and 510). Such communication module(s) may, for example, share any or all characteristics with the communication interface module(s) 410, 420 discussed previously with regard to FIG. 4. For example and without limitation, the communication interface module(s) 510 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary television receiver 500 is also illustrated as comprising various wired 506 and/or wireless 505 front-end modules that may, for example, be included in the communication interface modules and/or utilized thereby.

The exemplary television receiver 500 may also comprise any of a variety of signal processing module(s) 590. Such signal processing module(s) 590 may share any or all characteristics with modules of the exemplary television receiver 400 that perform signal processing. Such signal processing module(s) 590 may, for example, be utilized to assist in processing various types of information discussed previously (e.g., with regard to sensor processing, position determination, video processing, image processing, audio processing, general user interface information data processing, etc.). For example and without limitation, the signal processing module(s) 590 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., keypad I/O, touch screen processing, motor control, etc.).

In summary, various aspects of the present invention provide a system and method in a television receiver (e.g., external to a television) for providing user-selection of objects in a television program. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for identifying a user-selected object in television programming, the method comprising:
    in a television receiver:
        receiving television programming for presentation on a screen of a television;
        receiving information of user-selectable objects in the received television programming;
        communicating the television programming and the information of the user-selectable objects in the television programming for presentation on the screen of the television;
        determining an on-screen pointing location pointed to by a controller apparatus;
        identifying a subset of the user-selectable objects in the television programming in a region associated with the determined on-screen pointing location; and
        selecting, by a processor in the television receiver in response to the identifying of the subset of the user-selectable objects, a user-selectable object with the highest monetary value from the identified subset of user-selectable objects in the region, wherein a monetary value is associated with the respective user-selectable objects in the subset.

2. The method of claim 1, wherein said identifying comprises:
    determining respective regions of the television screen associated with respective user-selectable objects.

3. The method of claim 1, wherein receiving information identifying the user-selectable objects in the television programming comprises receiving said information embedded in a same data stream as a stream communicating the television programming to the television receiver.

4. The method of claim 1, wherein receiving information identifying the user-selectable objects in the television programming comprises receiving said information in a data stream communicated in parallel with a stream communicating the television programming to the television receiver.

5. The method of claim 1, wherein the information identifying the user-selectable objects in the television programming is communicated with the television programming without being requested by the television receiver.

6. The method of claim 1, wherein the information identifying the user-selectable objects in the television programming comprises timing information associated with the selectable objects.

7. The method of claim 1, wherein the information identifying the user-selectable objects in the television programming comprises information defining respective regions of the television programming associated with respective selectable objects in the television programming.

8. The method of claim 7, wherein the information defining respective regions of the television programming associated with the respective selectable objects comprises information describing movement of the respective regions.

9. The method of claim 1, wherein said determining comprises low-pass filtering a plurality of determined on-screen pointing locations.

10. The method of claim 1, wherein the communicated television programming comprises real-time broadcast television programming received by the television receiver and communicated for presentation on the screen in real time.

11. The method of claim 1, wherein:
    the communicated television programming is user-stored; and
    the information identifying selectable objects is user-stored.

12. The method of claim 1, comprising generating a signal comprising characteristics adapted to cause the television to generate a user output indicating the identified user-selectable object.

13. The method of claim 12, wherein said generated signal comprises characteristics adapted to cause the television to overlay a graphical feature coinciding with the identified user-selectable object on the television programming as the television programming is presented to the user.

14. The method of claim 1, wherein the television receiver is external to the television.

15. The method of claim 1, wherein the monetary value associated with a user-selectable object comprises an advertising fee associated with the user-selectable object.

16. A television receiver comprising:
   at least one module operable to, at least:
      receive television programming for presentation on a screen of a television;
      receive information identifying user-selectable objects in the television programming
      communicate the television programming for presentation on the screen of the television;
      determine an on-screen pointing location pointed to by a television remote control device;
      identify, by a processor in the television receiver, a user-selectable object from a subset of user selectable objects in the television programming at which the user is pointing based, at least in part, on the determined on-screen pointing location and a highest monetary value associated with the subset of user-selectable objects; and
      communicate information indicating the identified user-selectable object for presentation.

17. The television receiver of claim 16, wherein the at least one module is operable to identify a user-selectable object in the television programming by, at least in part, operating to:
   determine respective regions of the television screen associated with respective user-selectable objects; and
   identify a user-selectable object in the television programming at which the user is pointing based, at least in part, on the determined on-screen pointing location and the determined respective regions.

18. The television receiver of claim 17, wherein said at least one module is operable to identify a user-selectable object in the television programming by, at least in part, operating to:
   determine a region of the television screen associated with the on-screen pointing location;
   determine respective user-selectable objects associated with the region; and
   select a user-selectable object in the region at which the user is pointing based, at least in part, on a duration for which the user-selectable object has been displayed in the television programming.

19. The television receiver of claim 16, wherein the at least one module is operable to receive information identifying the user-selectable objects in the television programming by, at least in part, operating to receive said information embedded in a same data stream as a stream communicating the television programming to the television receiver.

20. The television receiver of claim 16, wherein the at least one module is operable to receive information identifying the user-selectable objects in the television programming by, at least in part, operating to receive said information in a data stream communicated in parallel with a stream communicating the television programming to the television receiver.

21. The television receiver of claim 16, wherein the information identifying the user-selectable objects in the television programming is communicated with the television programming without being requested by the television receiver.

22. The television receiver of claim 16, wherein the information identifying the user-selectable objects in the television programming comprises timing information associated with the selectable objects.

23. The television receiver of claim 16, wherein the information identifying the user-selectable objects in the television programming comprises information defining respective regions of the television programming associated with respective selectable objects in the television programming.

24. The television receiver of claim 23, wherein the information defining respective regions of the television programming associated with the respective the user-selectable objects comprises information describing movement of the respective regions.

25. The television receiver of claim 16, wherein the at least one module is operable to determine the on-screen pointing location by, at least in part, operating to low-pass filter a plurality of determined on-screen pointing locations.

26. The television receiver of claim 16, wherein the at least one module is operable to identify a user-selectable object by, at least in part, operating to identify a closest user-selectable object to the determined on-screen pointing location.

27. The television receiver of claim 16, wherein the at least one module is operable to generate a signal comprising characteristics adapted to cause the television to generate a user output indicating the identified user-selectable object.

28. The television receiver of claim 27, wherein said generated signal comprises characteristics adapted to cause the television to overlay a graphical feature coinciding with the identified user-selectable object on the television screen as the television programming is presented.

29. The television receiver of claim 27, wherein said generated signal comprises characteristics adapted to cause the television remote control device to overlay a graphical feature coinciding with the identified user-selectable object on the screen of the television remote control device.

30. The television receiver of claim 16, wherein the television receiver is external to the television.

31. The television receiver of claim 16, wherein the television programming is not an electronic program guide.

32. A method for identifying a user-selected object in television programming, the method comprising:
   in a television receiver:
      communicating television programming for presentation on a screen of a television, the television programming comprising user-selectable objects;
      determining an on-screen pointing location pointed to by a user of the television;
      identifying, by a processor in the television receiver, a user-selectable object from a subset of user selectable objects in the television programming at which the user is pointing based, at least in part, on the determined on-screen pointing location and a highest monetary value associated with the subset of user-selectable objects.

33. The method of claim 32, wherein the identifying comprises identifying the user-selectable object in the television programming at which the user is pointing based, at least in part, on the history of the selection of the user-selectable object by the user.

34. The method of claim 32, wherein the identifying comprises identifying the user-selectable object in the television programming at which the user is pointing based, at least in part, on the newness of the user-selectable object, wherein the newness is based on a duration for which the user-selectable object has been displayed on the television screen.

35. The method of claim 32, wherein the television programming is not an electronic program guide.

* * * * *